Oct. 9, 1956 — H. C. AHLGREN — 2,766,437
STORAGE BATTERY TERMINAL TENSIONING DEVICE
Filed June 11, 1954
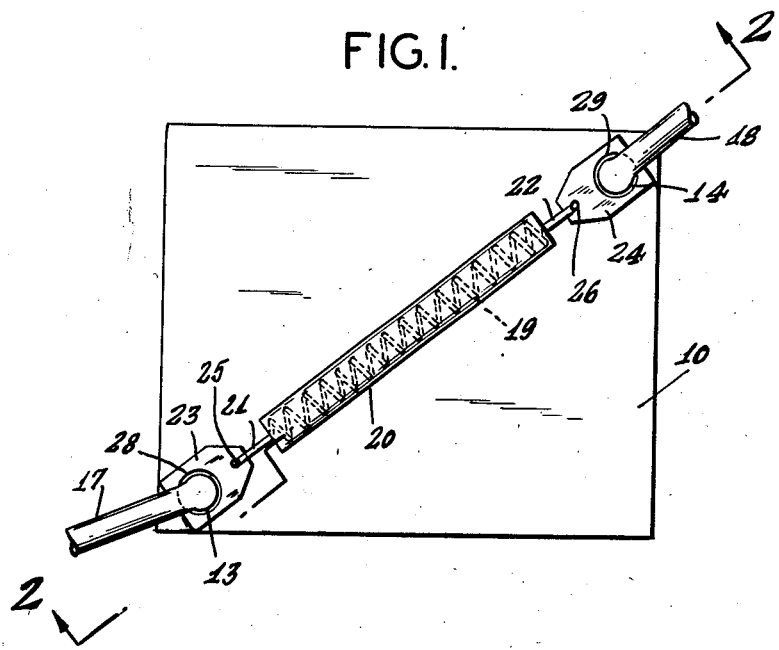
FIG. I.
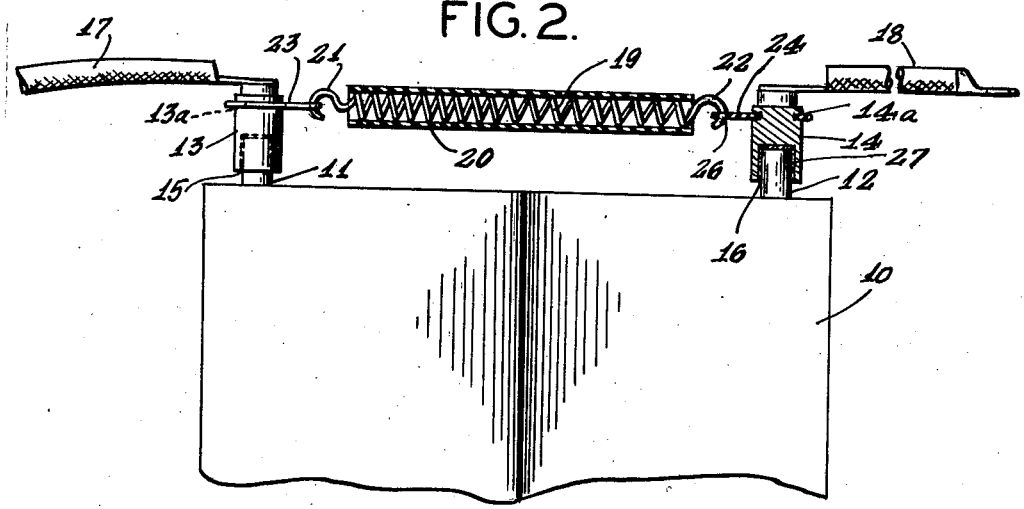
FIG. 2.
INVENTOR.
HERBERT C. AHLGREN
BY H. G. Manning
ATTORNEY.

United States Patent Office 2,766,437
Patented Oct. 9, 1956

2,766,437

STORAGE BATTERY TERMINAL TENSIONING DEVICE

Herbert C. Ahlgren, Middlefield, Conn.

Application June 11, 1954, Serial No. 436,098

6 Claims. (Cl. 339—224)

This invention relates to storage batteries, and more particularly to a resilient spring device for exerting tension upon a pair of inverted metallic caps fitted loosely upon the tops of the two upstanding terminal posts of a storage battery.

One object of the present invention is to provide a pair of tensioned battery post terminal caps which are easy to install and remove.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawing, one form in which the invention may conveniently be embodied in practice.

In the drawing:

Fig. 1 represents a top plan view of a storage battery with the improved battery terminal caps, stabilizer plates and central tensioning spring assembled thereon.

Fig. 2 is a side view of the same, partly in section, and on an enlarged scale, taken along the broken line 2—2 of Fig. 1, looking in the direction of the arrows.

It is well known that corrosion of the storage battery acid causes the usual battery terminals to become stuck on the posts making it difficult to remove said terminals.

With the usual clamping jaws having nuts and bolts commonly employed for connecting electric cables with battery terminal posts, acid corrosion frequently caked the parts, so that the bolts and nuts became frozen to such an extent that it was almost impossible to remove the nuts.

The present invention overcomes these disadvantages and permits quick engagement and disengagement of the connections without tools, and will constantly maintain good electrical contact between the terminal caps and the battery posts.

Referring now to the drawing, in which like reference numerals denote corresponding parts, throughout the several views:

The numeral 10 indicates a common form of rectangular storage battery having upstanding cylindrical terminal posts 11 and 12, which may or may not be tapered, said posts being located at the diagonally opposite corners of the storage battery 10.

According to the present invention, provision is made of a pair of inverted, cylindrical, metallic terminal caps 13 of cylindrical shape having upper grooves 13a and 14a for a purpose to be hereinafter described.

The caps 13 and 14 are provided with bottom sockets 15 and 16 which are adapted to fit loosely over the battery terminal posts 11 and 12.

The caps 13 and 14 are adapted to be welded to a pair of insulated electric cables 17 and 18 of the usual construction.

In order to exert constant tension upon the caps 13 and 14 so that they will be tilted in order to maintain a good electrical contact with the terminal posts 11 and 12, provision is made of a central coiled tension spring 19 having a flexible tubular cover 20 of corrosion-resisting material, such as rubber, to prevent injury of said spring 19 by the battery liquid.

The coil spring 19 is provided with a pair of downwardly opening end hooks 21, 22 which are adapted to be received within a pair of apertures 25, 26 respectively in a pair of thin flat stabilizer plates 23, 24 of non-corrodable insulating material.

The stabilizer plates 23, 24 are provided with large apertures 28, 29 which are adapted to fit loosely over the caps 13 and 14, and engage within the grooves 13a and 14a thereof.

Also provision is made of lubricating grease 27, such as Vaseline, located within the interior of the sockets 15 and 16 of the caps 13 and 14.

Operation

Whenever it is desired to remove the terminal caps 13 and 14 from the battery posts 11 and 12, it will merely be necessary to lift said caps upwardly, and disconnect one or both of them from the posts 11 and 12.

While there has been disclosed in this specification, one form in which the invention may be embodied, it is to be understood that this form is shown for the purpose of illustration only and that the invention is not limited to the specific disclosure but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In a tensioning device for improving the electrical contacts of a pair of conductors with a pair of battery posts, a pair of rockable, metallic, terminal members having sharp edges embracing said posts, a pair of apertured insulating plates secured to said members, and resilient means for detachably connecting said plates to each other to cause said terminal members to rock and bite into said posts.

2. The invention as defined in claim 1, in which said resilient means comprises a coiled tension spring.

3. The invention as defined in claim 2, in which said coiled spring is covered by a flexible insulating tube to prevent corrosion of said spring by the battery liquid.

4. The invention as defined in claim 1, in which said rockable terminal members comprise a pair of inverted metal caps filled with grease.

5. The invention as defined in claim 4, in which said insulator plates are provided with apertures larger than the diameter of said caps.

6. The invention as defined in claim 5, in which said caps are provided with grooves near the upper portions thereof for loosely fitting in the apertures of said insulator plates.

References Cited in the file of this patent

UNITED STATES PATENTS

| | | |
|---|---|---|
| 1,514,544 | Lang | Nov. 4, 1924 |
| 1,609,799 | Douglas | Dec. 7, 1926 |
| 1,690,118 | Julyan | Nov. 6, 1928 |
| 1,769,536 | Oak | July 1, 1930 |